United States Patent Office 2,901,910
Patented Sept. 1, 1959

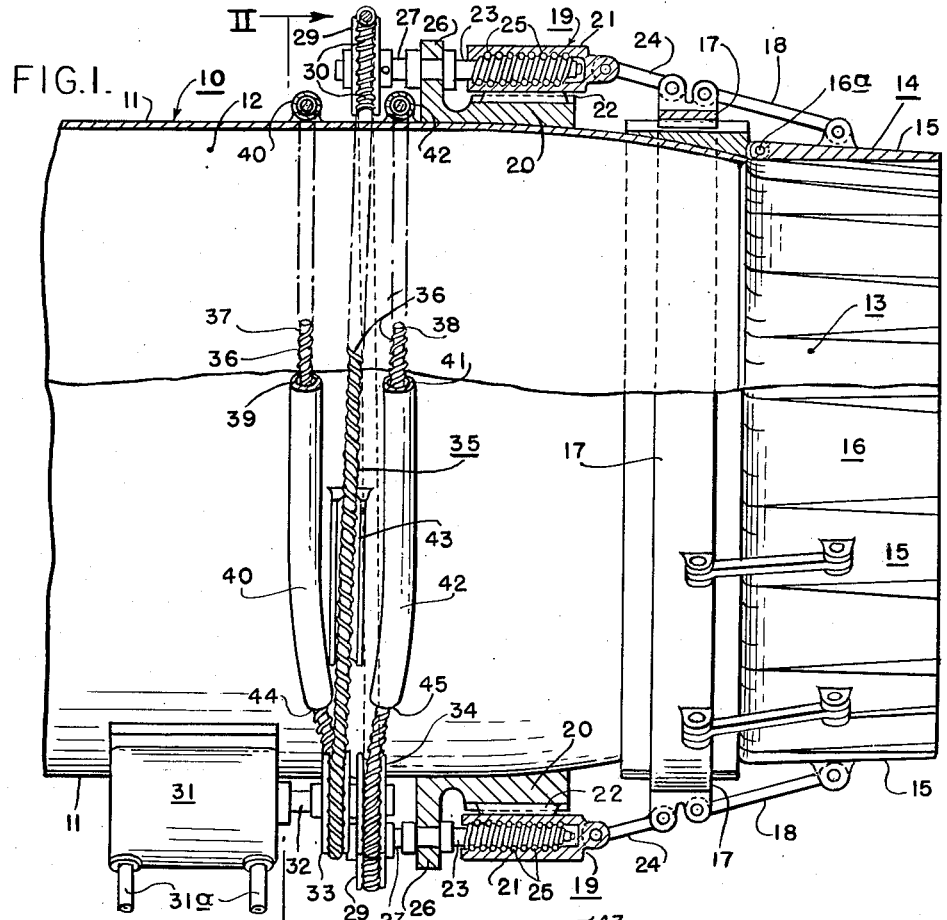
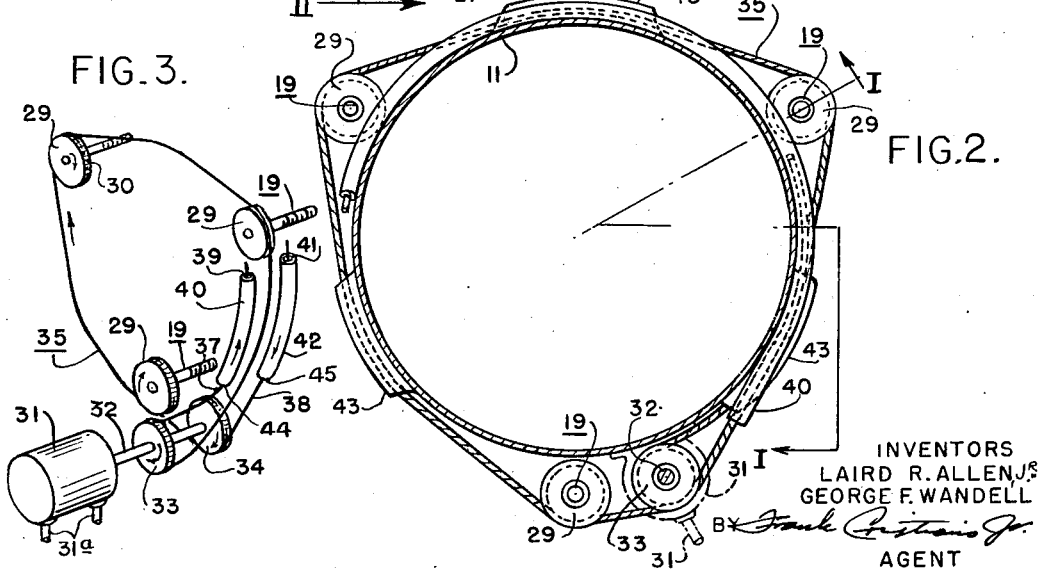
INVENTORS
LAIRD R. ALLEN J.
GEORGE F. WANDELL
AGENT

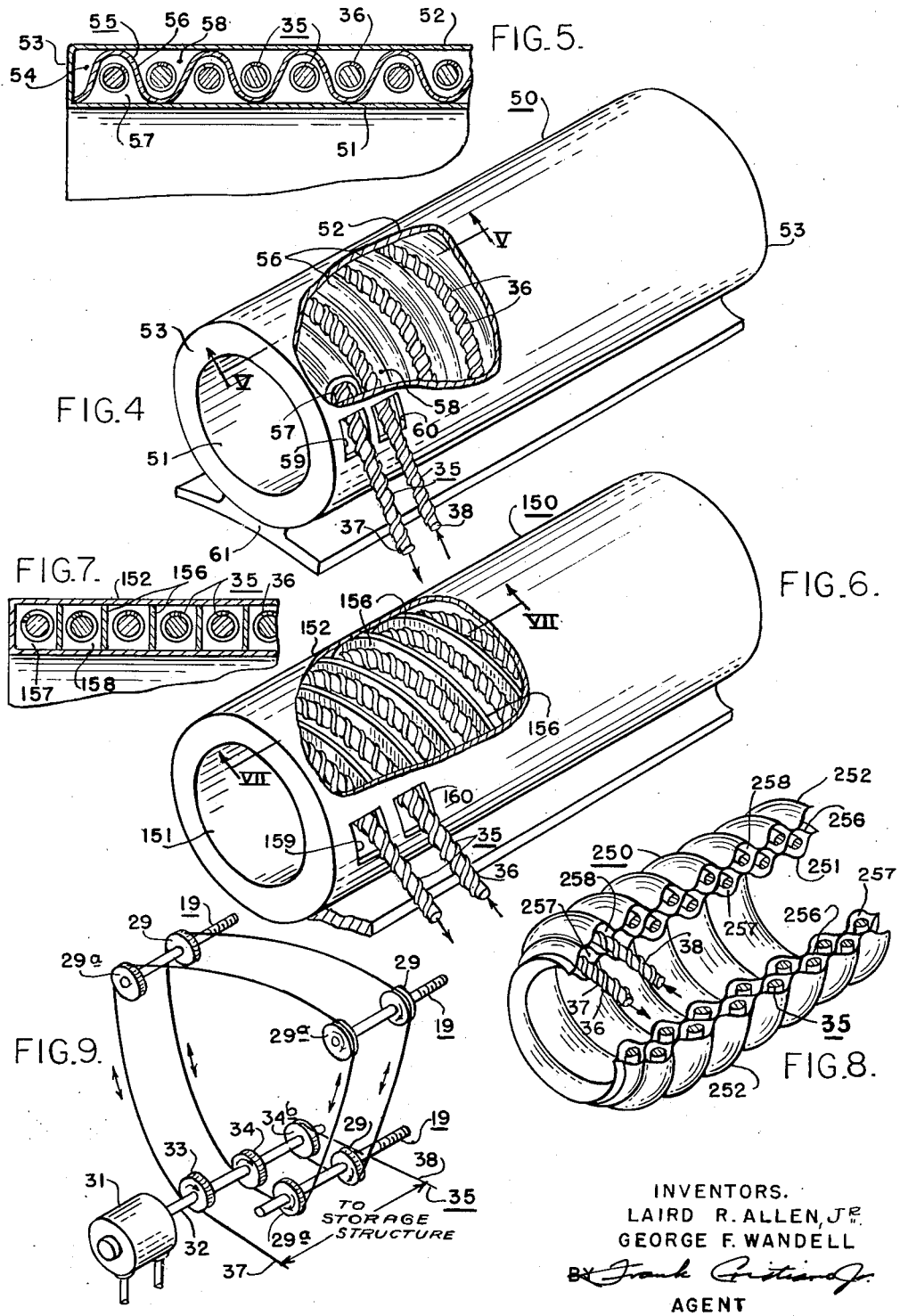

2,901,910

ACTUATING MECHANISM

George F. Wandell, Kansas City, Mo., and Laird R. Allen, Jr., Overland Park, Kans., assignors to Westinghouse Electric Corporation, East Pittsburgh, Pa., a corporation of Pennsylvania Application April 22, 1957, Serial No. 654,139

9 Claims. (Cl. 74—1)

This invention relates to actuating mechanisms, more particularly to actuating mechanisms employing a flexible drive cable movable in either direction a limited extent and has for an object to provide improved structure of this type.

It is a further object of the invention to provide a cable driven actuating mechanism in which the cable is unspliced at its opposite ends and having a simple yet highly reliable structure for storing the free end portions of the cable.

Another object of the invention is to provide in an actuating mechanism employing a flexible cable for synchronizing the movement of a plurality of screw actuators in extending direction as well as retracting direction, an arrangement permitting employment of a drive cable having unanchored free end portions and providing means for storing the free end portions of the cable.

Yet another object of the invention is to provide an actuating mechanism of the above type in which structure for storing the free ends of the cable is provided and arranged in a manner to maintain ingress and egress of the free end portions of the cable in fixed planes.

A more specific object is to provide a cable storage structure for use in a cable driven actuating mechanism of the above type, which is simple in form and compact yet capable of storing considerable length of cable.

A further object is to provide a highly improved cable actuated mechanism for rapidly yet positively positioning a movable exhaust nozzle structure or the like on an aviation jet engine.

In accordance with the invention, in an aviation jet engine having a movable exhaust nozzle structure such as a variable area nozzle, a plurality of screw actuators are provided for positioning the nozzle. Each of the screw actuators is provided with a sheave driven by a flexible drive cable which in turn is driven by a pair of driving sheaves connected to a reversible motor. The cable is preferably of any suitable positive driving type having a continuous series of driving elements cooperating with mating elements on the sheaves to obviate slippage and insure synchronous movement of the screw actuators. Drive cable of this type is difficult to splice at the free ends to form a conventional looped cable. Accordingly, the free end portions of the cable are slidably received in a stationary storage chamber having a pair of tunnels of sufficient length to accommodate the free end portions as one end portion is pulled out of and the other end portion is pushed into the tunnels during operation.

The cable storage chamber may be arranged to impart various configurations to the tunnels ranging from helical or spiral shapes to simpler elongated shapes. The tunnels may further be juxtaposed for compactness and provided with openings lying in substantial alignment with the drive sheaves.

The foregoing and other objects are effected by the invention as will be apparent from the following description and claims taken in connection with the accompanying drawings, forming a part of this application, in which:

Fig. 1 is a side elevational view with portions in section, of the aft end of an aviation turbojet engine showing an exhaust nozzle actuating mechanism embodying one form of the invention;

Fig. 2 is a transverse section taken on line II—II of Fig. 1, on a smaller scale;

Fig. 3 is a diagrammatic perspective view illustrating the driving arrangement of the actuating mechanism;

Fig. 4 is a perspective view of a second embodiment of the cable storage structure with a part of the casing broken away to show internal details;

Fig. 5 is a fragmentary sectional view taken on line V—V of Fig. 4;

Fig. 6 is a perspective view similar to Fig. 4 but showing a third embodiment of the storage structure;

Fig. 7 is a fragmentary sectional view taken on line VII—VII of Fig. 6;

Fig. 8 is a fragmentary perspective view of a storage structure illustrating a fourth embodiment of the storage structure; and Fig. 9 is a perspective diagrammatic view similar to Fig. 3, but showing another driving arrangement.

Referring to the drawings in detail, especially Figs. 1 through 3, there is shown (in Fig. 1) the aft end or exhaust outlet portion 10 of an aviation turbojet engine. The forward part of the engine has not been shown, since it may be of any suitable type and forms no part of the invention. The exhaust outlet portion 10, as well known in the art, is provided with a tubular shell member 11, which may be a continuation of the engine casing, and forms an elongated passageway 12 through which the gases from the engine are ejected in a jet to the ambient air by way of an exhaust outlet 13 to provide a propulsive thrust.

A variable area exhaust nozzle structure 14 of any suitable form is provided for varying the area of the exhaust outlet 13, for reasons well known in the art. As illustrated, the variable area exhaust nozzle structure 14 is of the type having an annular array of leaves 15 and 16 hingeably mounted to the shell member 11 adjacent the exhaust outlet 13 by a series of pins 16a. The leaves 15 (generally known as the master leaves) are interconnected with the leaves 16 (generally known as the slave leaves) in such a manner that when the leaves 15 are actuated, the leaves 16 are jointly movable therewith. The master leaves 15 are movably connected to an annular unison ring member 17 encompassing the shell 11, by means of a plurality of movably mounted links 18 in such a manner that as the unison ring 17 is translated axially in forward direction (to the left as viewed in Fig. 1) the leaves are moved in a direction to increase the exhaust nozzle area, while when the unison ring 17 is translated axially in rearward direction the leaves are moved in a direction to reduce the cross sectional area of the exhaust nozzle.

According to the invention, a plurality of (in this instance three) screw actuator mechanisms 19 are provided for positioning the unison ring 17. (Since the screw actuators may be substantially identical only one will be described.) The screw actuator 19, as illustrated, is provided with a support member 20 and is thereby attached to the engine shell 11 in mutually spaced relation with the other actuators, as best shown in Fig. 2. The screw actuator 19 has an axially movable female screw or threaded member 21 slidably mounted upon a guide 22 formed in the support member 20 and a complementary male screw or threaded member 23 threadably received therein. The female threaded member 21 is connected to the unison ring 17 by means of a pivotally mounted link member 24. The screw actuator 19 has been illustrated as being of the well-known ball screw type in which friction between the male and female members 23 and 21, respectively, is substantially reduced by a helical row of rollable ball members 25 disposed therebetween. The male member 23 is rotatably supported by a bearing member 26 formed in the support member 20 and has an elongated shaft portion 27 extending through the bearing member 26. The shaft portion 27 has attached thereto a sheave 29 (hereinafter termed a driven sheave) and provided with a series of arcuate spiral recesses 30 in its outer periphery for a purpose subsequently to be described.

A motor 31 for driving the screw actuators 19 is attached to the tubular shell 11 in any suitable manner. The motor is a reversible high speed motor and, as illustrated, is of the air actuated type having a pair of air supply conduits 31a alternately connectible to a suitable source of pressurized air (not shown). Details of the motor and the control therefor have not been shown, since they form no part of the invention. The motor 31 is provided with an output shaft 32 to which are attached a pair of driving sheaves 33 and 34. The driving sheaves 33 and 34 are provided with an annular row of spiral recesses (not shown) on their outer peripheries in a manner similar to the driven sheaves 29. A flexible drive cable 35 is looped about the drive sheave 33, the driven sheaves 29, and the drive sheave 34, as best shown in Fig. 3, to provide a continuous open loop operatively connecting all of the sheaves together for joint operation. The drive cable 35 is of the spirally wrapped type having an outer wire wrap 36 whose convolutions are adapted to mate with the spiral recesses 30 formed in the sheaves 29, and the spiral recesses formed in the sheaves 33 and 34, thereby insuring positive rotation of the sheaves without slippage of the cable.

The cable 35 is of the unspliced type having its free end portions 37 and 38 unconnected to each other. The free end portion 37 extends beyond the drive sheave 33 and is slidably received within a tunnel 39 formed in a storage member 40 of elongated tubular shape. In a similar manner, the free end portion 38 is slidably received in a tunnel 41 formed in an elongated tubular storage member 42. The storage members 40 and 42 are of substantially annular configuration and are attached to the shell 11 in a plane transverse to its longitudinal axis. The tunnels 39 and 41 are of sufficient length to accommodate the free end portions 37 and 38 during translation of the cable. Also, if desired, suitable guide members 43 of arcuate shape may be attached to the engine shell 11 at regions intermediate the screw actuators 19 to provide a smooth sliding surface for the cable 35 during operation.

In operation, when it is desired to actuate the variable area exhaust nozzle structure 14 in area-reducing direction, the motor 31 is energized by flow of air through conduits 31a for rotation in one direction, thereby rotating the drive sheaves 33 and 34 in a direction to translate the cable 35 in clockwise direction when viewed as shown in Fig. 2. The driven sheaves 29 are thus rotated in the same direction, causing the female threaded members 21 of the actuators 19 to be extended with attendant movement of the unison ring 17 in aft direction and pivotal movement of the leaves 15 and 16 in exhaust nozzle area reducing direction. During such movement, the free end portion 38 of the cable is partially pulled out of the storage member 42 as determined by the extent of linear movement of the cable 35. Concomitantly therewith, the free end portion 37 of the cable is pushed further into the storage member 40. The length of each of the free end portions 37 and 38 is sufficient to insure that a portion of the cable is maintained within the storage members 40 and 42 in all conditions of operation of the actuating mechanism.

In order to assure maximum freedom of movement of the cable 35 with a minimum of friction, the storage members 40 and 42 are provided with access openings 44 and 45, respectively, disposed adjacent to and in alignment with the peripheries of driving sheaves 33 and 34, respectively.

When it is desired to actuate the exhaust nozzle structure 14 in area increasing direction, the motor 31 is energized for rotation in the opposite direction, thereby reversing the rotation of the sheaves, and causing the female threaded member 21 to be retracted. The unison ring 17 is thus translated to the left, causing the leaves 15 and 16 to move in radially outward direction. During such operation, the free end portion 37 of the cable is partially pulled out of the storage member 40 while the free end portion 38 is partially fed back into the storage member 42.

In Figs. 4 and 5, there is shown a modified storage structure 50 having an inner tubular wall member 51 and an outer tubular wall member 52 disposed in encompassing relation to the inner wall 51 and radially spaced therefrom. Also, a pair of annular end walls 53 may be provided for connecting the inner wall member to the outer wall member and jointly therewith defining an annular chamber 54 within which is received a convoluted sheet metal member 55 having a continuous spiral convolution 56. The spiral convolution 56 is of sufficient height to extend from the inner wall member 51 to the outer wall member 52 and forms a first spiral tunnel 57 with the inner wall member 51 and, in juxtaposition therewith, a second spiral tunnel 58 with the outer wall member 52. As shown in Fig. 4, the outer wall member 52 is provided with a pair of openings 59 and 60 disposed in registry with the ends of the tunnels 57 and 58, respectively.

The tunnels 57 and 58 serve to store the free ends 37 and 38 of the cable 35 in somewhat the same manner as mentioned in connection with the first embodiment. That is, the free end portion 37 of the cable is directed through the opening 59 and is slidably received in the tunnel 57 while the other free end portion 38 of the cable is directed through the opening 60 and is slidably received in the tunnel 58. The convoluted member 56 is formed in a manner to provide a suitable number of turns to the tunnels 57 and 58 to permit storage therein of a considerable length of the free ends 37 and 38. Also, a mounting flange portion 61 may be provided for attaching the storage structure 50 to the engine shell 11 or other suitable structure.

The storage structure 50 operates in somewhat the same manner as the storage members 40 and 42 described in the first embodiment. That is, when the cable 35 is moved in one direction, the free end 37 is pulled outwardly through the opening 59, while the free end 38 is pushed inwardly through the opening 60. Conversely, when the cable 35 is moved in the opposite direction the free end 37 is pushed inwardly through the opening 59 while the free end 38 is pulled outwardly through the opening 60. Movement of the free ends 37 and 38 is attained even though the tunnels are spirally formed, since the free ends 37 and 38 are guided and supported by the convoluted member 55.

In Figs. 6 and 7 there is shown a storage structure 150 somewhat similar to the storage structure 50 shown in Figs. 4 and 5. However, in this embodiment the helical tunnels 157 and 158 are partially defined by a helically formed strip member 156 of flat surface contour disposed between an inner wall member 151 and an outer wall member 152 disposed in mutually radially spaced relationship. The outer wall member 152 is provided with a pair of openings 159 and 160 disposed in registry with the ends of the tunnels 157 and 158, respectively. The free ends 37 and 38 of the cable 35 are directed through the openings 159 and 160 and slidably received in the tunnels 157 and 158 in the manner previously described. This embodiment operates in substantially the same manner as that shown in Figs. 4 and 5.

In Fig. 8 there is shown a further modified storage structure 250 having an outer spirally convoluted wall member 252, an inner spirally convoluted wall member 251 and an intermediate spirally convoluted partition member 256 disposed in nested relation with each other and defining a first tunnel 257 and a second tunnel 258 for reception of the free ends 37 and 38, respectively, of the cable. It will be noted that in this embodiment the tunnel 257 is defined by the intermediate partition member 256 and the inner wall member 251, while the second tunnel 258 is defined by the intermediate partition member 256 and the outer wall member 252, thereby providing an arrangement in which the tunnel 257 is of smaller diameter than and lies radially inwardly of the tunnel 258. The storage structure 250 operates in substantially the same manner as that shown in Figs. 4 and 5.

In Fig. 9 there is schematically shown a second actuating arrangement illustrating a modification of the cable drive shown in Fig. 3. Hence, for ease of comparison, like elements will be given like reference numbers. In this embodiment the three screw actuators 19 are provided with driven sheaves 29 and in addition thereto a second set of driven sheaves 29a are provided. Also, the actuating motor 31 is provided with a pair of drive sheaves 33 and 34 mounted on its output shaft 32. However, in addition to the drive sheaves 33 and 34, a third drive sheave 34b is provided. The cable 35 is directed over the drive sheave 33 and the driven sheaves 29a in a first loop, then over the drive sheave 34 and the driven sheaves 29 in a second loop and finally over the drive sheave 34b. The free ends 37 and 38 of the cable are directed into a storage structure (not shown) which may assume any configuration similar to those shown in the previously described embodiments. With this arrangement the cable 35 may be of lighter construction so that it is capable of withstanding only half the tensile load that the cable shown in Figs. 1 through 3 is designed to carry. However, since the cable 35 is looped about the two sets of sheaves, the loads imposed thereon by the actuators is divided between the two sets of driven sheaves 29 and 29a and the tensile stress imposed on the cable 35 is divided between each cable loop.

It will now be seen that the invention provides a relatively simple, yet highly satisfactory cable actuated mechanism for moving a movable load such as the exhaust nozzle structure 14 shown and described.

It will further be seen that the invention provides a cable actuated mechanism in which the cable is not spliced at its ends and in which the free ends are stored in suitable structure which may be anchored in the optimum position.

It will further be seen that since the storage structure is anchored and since the access openings for the tunnels are aligned with the drive sheaves, the free ends of the cables are translated past the drive sheaves with substantially no weaving motion.

Although the invention has been shown in combination with a variable area exhaust nozzle for an aviation jet engine it will be obvious that the actuating mechanism may be utilized for moving other movable structures wherein a plurality of actuators are synchronously driven by a flexible cable.

Also, the drive elements on the flexible cable 35 and the sheaves may assume other forms providing positive driving without slippage therebetween.

While the invention has been shown in several forms, it will be obvious to those skilled in the art that it is not so limited, but is susceptible of various other changes and modifications without departing from the spirit thereof.

What is claimed is:

1. Actuating mechanism comprising a movable structure, a plurality of screw actuators disposed in mutually spaced relationship, each of said screw actuators including a first screw member and a complementary second screw member rotatable relative to each other, means connecting each said first screw member to said movable structure, a sheave carried by each said second screw member and jointly rotatable therewith, a flexible drive member engaging each said sheave, said drive member having a pair of free end portions, a motor for driving said drive member in either direction, and means for storing the free end portions of said drive member including wall structure defining a pair of elongated tunnels, said free end portions being slidably received in said tunnels and said tunnels being of sufficient length to retain said free end portions during operative translation of said drive member in either direction by said motor.

2. Actuating mechanism comprising a plurality of rotatable actuator members disposed in mutually spaced relationship, a reversible motor having a drive shaft for driving said actuator members and including a driving sheave attached to said drive shaft, driven sheaves attached to said actuator members, a flexible drive member engaging said driving sheave and each of said driven sheaves, said drive member having a pair of free end portions, and means for storing the free end portions of said drive member including wall structure defining a pair of elongated tunnels, said free end portions being slidably received in said tunnels and said tunnels being of sufficient length to retain said free end portions during operative translation of said drive member in either direction by said motor.

3. Actuating mechanism comprising a movable structure, a plurality of screw actuators disposed in mutually spaced relationship, each of said screw actuators including a first screw member and a complementary second screw member rotatable relative to each other, means connecting each said first screw member to said movable structure, a sheave carried by each said second screw member and jointly rotatable therewith, a flexible drive member engaging each said sheave, said drive member having a pair of free end portions, a motor for driving said cable in either direction, and means for storing the free end portions of said drive member including tubular wall structure disposed adjacent said motor and defining a pair of juxtaposed elongated tunnels of substantially curved shape, said free end portions being slidably received in said tunnels and said tunnels being of sufficient length to retain said free end portions during operative translation of said drive member in either direction by said motor.

4. In a jet engine having a tubular casing defining an exhaust gas outlet and a movable structure for modifying said exhaust outlet; an actuating mechanism for positioning said movable structure comprising a plurality of screw actuators carried by said casing and disposed in mutually spaced relationship, each of said screw actuators including a first screw member and a complementary second screw member rotatable relative to each other, means for connecting each said first screw member to said movable structure, a driven sheave carried by each said second screw member and jointly rotatable therewith, a flexible drive member engaging each said driven sheave, said drive member having a pair of free end portions, a motor having a driving shaft for linearly translating said drive member in either direction, a driving sheave attached to said driving shaft and engaged by said drive member, said drive member and said driving sheave having complementary cooperating elements for preventing relative movement therebetween, and means for storing the free end portions of said drive memebr including wall structure defining a pair of elongated arcuate tunnels, said free end portions being slidably received in said tunnels and said tunnels being of sufficient length to retain said free end portions during operative translation of said drive member in either direction by said motor.

5. Actuating mechanism comprising a plurality of rotatably mounted actuated members disposed in mutually spaced relationship, a reversible motor having a drive shaft for driving said actuator members including a pair of driving sheaves attached to said drive shaft, driven sheaves attached to said actuator members, a flexible drive cable engaging said driving sheaves and each of said driven sheaves, said cable and said driving sheaves having mutually cooperating positive drive elements, said cable having a pair of free end portions, and means for storing the free end portions of said cable including stationary tubular wall structure disposed adjacent said driving sheaves and defining a pair of elongated juxtaposed tunnels of substantially helical shape, said free end portions being slidably received in said tunnels and said tunnels being of sufficient length to retain said free end portions during operative translation of said cable in either direction by said motor.

6. Actuating mechanism comprising a plurality of rotatably mounted actuator members disposed in mutually spaced relationship, a reversible motor having a drive shaft for driving said actuator members in either direction a limited extent including first and second driving sheaves attached to said drive shaft, first and second driven sheaves attached to each of said actuator members, a flexible drive cable forming a first loop engaging said first driving sheave and each of said first driven sheaves, said cable further forming a second loop engaging said second driving sheave and each of said second driven sheaves, said cable and said sheaves having complementary cooperative positive drive elements, said cable having a pair of free end portions, and means for storing the free end portions of said cable including wall structure defining a pair of elongated tunnels, said free end portions being slidably received in said tunnels and said tunnels being of sufficient length to retain said free end portions during operative translation of said cable in either direction by said motor.

7. Actuating mechanism comprising a plurality of rotatably mounted actuator members disposed in mutually spaced relationship, a reversible motor having a drive shaft for driving said actuator members, means for operatively connecting said motor drive shaft to said actuator members including a pair of driving sheaves attached to said drive shaft, driven sheaves attached to said actuator members, a flexible drive cable engaging said drive sheaves and each of said driven sheaves, said cable having a pair of free end portions, and means for storing the free end portions of said cable including a stationary tubular wall structure defining a pair of juxtaposed elongated tunnels of spiral shape, said wall structure having a pair of juxtaposed openings communicating with said tunnels and disposed in substantial alignment with the peripheries of said driving sheaves, said free end portions being slidably received in said tunnels through said openings and said tunnels being of sufficient length to retain said free end portions during operative translation of said cable in either direction by said motor.

8. A cable storage structure for storing the free end portions of a pair of cables comprising a stationary inner tubular wall member, a stationary outer tubular wall member disposed in encompassing relation with said inner wall member and together therewith defining an annular space, and a convoluted member disposed in said space and together with said inner and outer wall structure defining a pair of juxtaposed spiral tunnels for slidably guiding the free end portions of the cables in a spiral pattern, said outer wall member having a pair of juxtaposed openings communicating with said tunnels and permitting slidable movement of the cables therethrough.

9. A cable storage structure, for storing the free end portions of a pair of cables, comprising stationary wall structure having inner and outer tubular wall portions and end wall portions integrally connected to each other and defining a pair of juxtaposed spiral tunnels for slidably guiding the free end portions of the cables, said outer tubular wall portion having a pair of juxtaposed openings adjacent one end thereof, said openings being associated with, and in registry with, one end of said tunnels and permitting slidable movement of the cables therethrough.

References Cited in the file of this patent
UNITED STATES PATENTS

| | | |
|---|---|---|
| 507,157 | Otis | Oct. 24, 1893 |
| 561,215 | Fensom | June 2, 1896 |
| 696,901 | Fairchild | Apr. 1, 1902 |
| 2,094,707 | Jones | Oct. 5, 1937 |
| 2,161,044 | Heintz et al. | June 6, 1939 |
| 2,182,844 | Grumbacher | Dec. 12, 1939 |
| 2,321,780 | Tondeur | June 15, 1943 |
| 2,448,696 | Arens | Sept. 7, 1948 |
| 2,483,401 | Cole | Oct. 4, 1949 |
| 2,509,238 | Martin | May 30, 1950 |
| 2,528,528 | Lyon | Nov. 7, 1950 |

FOREIGN PATENTS

| | | |
|---|---|---|
| 25,887 | Great Britain | 1902 |